(12) United States Patent
Sisbot et al.

(10) Patent No.: US 9,517,175 B1
(45) Date of Patent: Dec. 13, 2016

(54) TACTILE BELT SYSTEM FOR PROVIDING NAVIGATION GUIDANCE

(71) Applicant: Toyota Jidosha Kabushiki Kaisha, Aichi-ken (JP)

(72) Inventors: Emrah Akin Sisbot, Mountain View, CA (US); Kentaro Oguchi, Menlo Park, CA (US); Akansel Cosgun, Atlanta, GA (US)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/012,170

(22) Filed: Aug. 28, 2013

Related U.S. Application Data

(60) Provisional application No. 61/785,344, filed on Mar. 14, 2013.

(51) Int. Cl.
    *G09B 21/00* (2006.01)
    *A61H 3/06* (2006.01)

(52) U.S. Cl.
    CPC .................... *A61H 3/061* (2013.01)

(58) Field of Classification Search
    None
    See application file for complete search history.

(56) References Cited

U.S. PATENT DOCUMENTS

| | | | |
|---|---|---|---|
| 5,040,116 A * | 8/1991 | Evans, Jr. ............. | G01S 17/936 180/169 |
| 6,198,395 B1 * | 3/2001 | Sussman ................... | 340/573.1 |
| 6,320,496 B1 * | 11/2001 | Sokoler et al. ............. | 340/407.1 |
| 6,486,784 B1 * | 11/2002 | Beckers ..................... | 340/573.1 |
| 6,662,141 B2 | 12/2003 | Kaub | |
| 6,744,370 B1 * | 6/2004 | Sleichter et al. ............. | 340/576 |
| 6,774,788 B1 * | 8/2004 | Balfe ....................... | 340/539.13 |
| 7,610,151 B2 | 10/2009 | Letchner et al. | |
| 7,986,828 B2 | 7/2011 | Rao et al. | |
| 8,166,421 B2 | 4/2012 | Magal et al. | |
| 8,583,661 B2 | 11/2013 | Fujii et al. | |
| 2002/0076100 A1 | 6/2002 | Luo | |
| 2003/0037720 A1 * | 2/2003 | Stockton ................... | 116/205 |
| 2003/0179133 A1 * | 9/2003 | Pepin ..................... | A61H 3/061 342/357.52 |

(Continued)

OTHER PUBLICATIONS

Shafiq Ur Rehman, "Expressing Emotion through Vibration for Perception and Control," Doctoral Thesis, Department of Applied Physics and Electronics, Umea University, Sweden, Apr. 2010. See pp. 131 & 146.*

(Continued)

*Primary Examiner* — John R Olszewski
*Assistant Examiner* — Navid Ziaeianmehdizadeh
(74) *Attorney, Agent, or Firm* — Patent Law Works LLP

(57) ABSTRACT

The disclosure includes a system and method for providing navigation guidance. The system includes a tracking application and a user. The tracking application determines a location of a user, determines a position of at least one object in proximity to the user, determines a path for the user to avoid the at least one object, generates linear and angular velocities that correspond to the path and generates directions that correspond to the linear and angular velocities. The user can receive the directions as audio instructions or via a tactile belt with motors that vibrate to convey the directions.

17 Claims, 10 Drawing Sheets

(56) References Cited

U.S. PATENT DOCUMENTS

| | | | |
|---|---|---|---|
| 2004/0091153 A1 | 5/2004 | Nakano et al. | |
| 2004/0210358 A1 | 10/2004 | Suzuki et al. | |
| 2005/0041839 A1* | 2/2005 | Saitou | H04N 1/00127 382/103 |
| 2005/0222713 A1* | 10/2005 | Kawabe | B25J 19/027 700/259 |
| 2006/0149621 A1* | 7/2006 | Do et al. | 705/14 |
| 2006/0184274 A1* | 8/2006 | Sakai | G05D 1/0246 700/245 |
| 2007/0058838 A1* | 3/2007 | Taniguchi | G06K 9/00664 382/103 |
| 2007/0135962 A1* | 6/2007 | Kawabe | G01S 17/74 700/225 |
| 2008/0004802 A1 | 1/2008 | Horvitz | |
| 2008/0112592 A1 | 5/2008 | Wu et al. | |
| 2008/0120025 A1 | 5/2008 | Naitou et al. | |
| 2008/0120029 A1 | 5/2008 | Zelek et al. | |
| 2008/0312709 A1* | 12/2008 | Volpe et al. | 607/6 |
| 2009/0244309 A1* | 10/2009 | Maison | G06K 9/00369 348/222.1 |
| 2009/0252423 A1 | 10/2009 | Zhu et al. | |
| 2010/0106603 A1 | 4/2010 | Dey et al. | |
| 2010/0302138 A1 | 12/2010 | Poot et al. | |
| 2010/0332126 A1* | 12/2010 | Huang et al. | 701/208 |
| 2011/0044506 A1 | 2/2011 | Chen | |
| 2011/0054781 A1* | 3/2011 | Ohkubo | 701/207 |
| 2011/0210915 A1 | 9/2011 | Shotton et al. | |
| 2011/0213628 A1 | 9/2011 | Peak et al. | |
| 2011/0249865 A1 | 10/2011 | Lee et al. | |
| 2011/0307172 A1* | 12/2011 | Jadhav et al. | 701/213 |
| 2011/0309926 A1 | 12/2011 | Eikelenberg et al. | |
| 2011/0317871 A1 | 12/2011 | Tossell et al. | |
| 2012/0070070 A1 | 3/2012 | Litvak | |
| 2012/0095681 A1 | 4/2012 | An et al. | |
| 2012/0150429 A1* | 6/2012 | Siotos | 701/411 |
| 2012/0184884 A1* | 7/2012 | Dyer et al. | 601/46 |
| 2012/0287266 A1* | 11/2012 | Varekamp | G06T 7/004 348/135 |
| 2013/0000156 A1* | 1/2013 | Andoh | 36/136 |
| 2013/0218456 A1* | 8/2013 | Zelek et al. | 701/412 |
| 2013/0265225 A1* | 10/2013 | Nasiri et al. | 345/156 |
| 2013/0317944 A1* | 11/2013 | Huang et al. | 705/26.61 |
| 2014/0009268 A1* | 1/2014 | Oshima et al. | 340/12.5 |
| 2014/0018985 A1 | 1/2014 | Gupta et al. | |
| 2014/0114574 A1* | 4/2014 | Tertoolen et al. | 701/533 |
| 2014/0180526 A1* | 6/2014 | Deshpande et al. | 701/25 |
| 2014/0266571 A1* | 9/2014 | Sharma | A43B 3/0005 340/4.12 |
| 2014/0324270 A1* | 10/2014 | Chan | G01S 17/42 701/28 |

OTHER PUBLICATIONS

Balachandran, Wamadeva et al., "A GPS Based Navigation Aid for the Blind," 17th International Conference on Applied Electromagnetics and Communications, Croatia, Oct. 1-3, 2003, pp. 34-36.
Edwards, Nathan et al., "A Pragmatic Approach to the Design and Implementation of a Vibrotactile Belt and Its Applications," 6 pages.
Heuten, Wilko et al., "Tactile Wayfinder: A Non-Visual Support System for Wayfinding," Proceedings: NordiCHI 2008, Oct. 20-22, 2008, 10 pages.
Koenig, Nathan, "Toward Real-Time Human Detection and Tracking in Diverse Environments," 5 pages.
Kulyukin, Vladimir et al., "A Robotic Wayfinding System for the Visually Impaired," 6 pages.
Melvin, A. Allan et al., "ROVI: A Robot for Visually Impaired for Collision-Free Navigation," Proceedings of the International Conference on Man-Machine Systems (ICoMMS), Malaysia, Oct. 11-13, 2009, 6 pages.
Pandey, Amit Kumar et al., "Towards a Sociable Robot Guide which Respects and Supports the Human Activity," 5th Annual IEEE Conference on Automation Science and Engineering, India, Aug. 22-25, 2009, 6 pages.
Pielot, Martin et al., "Evaluation of Continution Direction Encoding with Tactile Belts," 10 pages.
Rosenthal, Jacob et al., "Design Implementation and Case Study of a Pragmantic Vibrotactile Belt," 10 pages.
Spinello, Luciano et al., "A Layered Approach to People Detection in 3D Range Data," 6 pages.
Tsukada, Koji et al., "ActiveBelt: Belt-type Wearable Tactile Display for Directional Navigation," 16 pages.
Ulrich, Iwan et al., "The GuideCane—Applying Mobile Robot Technoloiges to Assist the Visually Impaired," IEEE Transactions on Systems, Man and Cybernetics—Part A: Systems and Humans, vol. 31, No. 2, Mar. 2001 pp. 131-136.
Van Erp, Jan B.F. et al., "Waypoint Navigation with a Virobtactile Waist Belt," ACM Transactions on Applied Perception, vol. 2, No. 2, Apr. 2005, pp. 106-117.
Xia, Lu et al., "Human Detection Using Depth Information by Kinect," 8 pages.
Koenig, "Toward Real-Time Human Detection and Tracking in Diverse Environments," IEEE 6th International Conference on Development and Learning (2007), pp. 94-98.
Fritsch, "Multi-modal anchoring for human-robot interaction," Robotics and Autonomous Systems 43 (2003) pp. 133-147.
U.S. Appl. No. 14/065,170, filed Oct. 28, 2013, entitled "Navigation System for Estimating Routes for Users".
U.S. Appl. No. 14/012,283, filed Aug. 28, 2013, entitled "Vibration Modality Switching System for Providing Navigation Guidance".
U.S. Appl. No. 14/012,194, filed Aug. 28, 2013, entitled "Person Detection and Pose Estimation System".
Rempel, "Glasses That Alert Travelers to Objects Through Vibration? An Evaluation of iGlasses by RNIB and AmbuTech," AFB AccessWorld Magazine, vol. 13, No. 9, Sep. 2012, http://www.afb.org/afbpress/pub.asp?DocID=aw130905.
Scheggi et al., "Vibrotactile haptic feedback for human-robot interaction in leader-follower tasks," in PETRA, Crete Island, Greece, 2012.
Lieberman et al., "TIKL: Development of a Wearable Vibrotactile Feedback Suit for Improved Human Motor Learning," IEEE Transactions on Robotics, vol. 23, No. 5, pp. 919-926, Oct. 2007.
Sergi et al., "Forearm orientation guidance with a vibrotactile feedback bracelet: On the directionality of tactile motor communication," in Proc. of the Int. Conf. on Biomedical Robotics and Biomechatronics, Scottsdale, AZ, 2008, pp. 133-138.
Guinan et al., "Back-to-back skin stretch feedback for communicating five degree-of-freedom direction cues," in IEEE World Haptics Conference, Daejeon, Korea, 2013.
Bark et al., "Rotational Skin Stretch Feedback: A Wearable Haptic Display for Motion," IEEE Transactions on Haptics, vol. 3, No. 3, pp. 166-176, Jul. 2010.
Rotella et al., "HAPI Bands: A haptic augmented posture interface," in HAPTICS Symposium, Vancouver, BC, 2012.
Hwang et al., "The Haptic Steering Wheel: Vibro-tactile based Navigation for the Driving Environment," Pervasive Computing and Communications Workshops (Percom Workshops), 2010 8th IEEE International Conference on IEEE, 2010 (6 pages).

\* cited by examiner

TACTILE BELT SYSTEM FOR PROVIDING NAVIGATION GUIDANCE

CROSS REFERENCE TO RELATED APPLICATION

This application claims priority under 35 USC §119(e) to U.S. Application No. 61/785,344, entitled "Free Moving Guide Robot" filed Mar. 14, 2013, the entirety of which is herein incorporated by reference.

BACKGROUND

1. Field of the Invention

The specification relates to a tactile belt system for providing navigation guidance. In particular, the specification relates to a tactile belt system that guides a visually-impaired person using a vibrating tactile belt.

2. Description of the Background Art

Human-machine interactions are dominated by audiovisual interfaces for consumer electronics with good reason: the information delivered to the user is very rich. In contrast, haptic interfaces provide less detailed information. However, haptic interfaces are sometimes more suitable for certain applications. For instance, a visual or audio interface might impose too much cognitive load for a driver assistance system. Moreover, visually impaired people do not have access to visual information and they usually reserve their hearing for monitoring their environment. For the blind and the elderly, even basic navigation skills become a challenge.

There has been research on information encoding via haptic interactions that is interpretable by humans. One way to implement haptic interactions is to stimulate the skin by using microactuators such as vibration motors found in cellphones.

Vibrotactile devices are used in a broad range of applications including waypoint navigation and facilitating navigation for people with reduced visual capacity. The intended application of a vibrotactile display device influences its design and form factor as they can be in the form of handheld devices, jewelry, shoe wear, wearable devices and a combination thereof. However, these devices provide limited information because of their size and design.

SUMMARY

The system overcomes the deficiencies of the prior art with systems and methods for providing navigation guidance. In one embodiment, the system includes a tracking application and a user. The tracking application determines a location of a user, determines a position of at least one object in proximity to the user, determines a path for the user to avoid the at least one object, generates linear and angular velocities that correspond to the path and generates directions that correspond to the linear and angular velocities.

In another embodiment, the system includes: a computing device and a tactile belt. The computing device includes a tracking application and supporting hardware for tracking the user's location. The tracking application determines a location of a tactile belt, determines a position of at least one object in proximity to the tactile belt, determines a path to avoid the at least one object, generates linear and angular velocities that correspond to the path and converts the linear and angular velocities to a vibrational pattern.

The tactile belt includes a microcontroller and motors. The microcontroller instructs the motors to vibrate in different patterns to guide the user to move in a certain direction. For example, for a directional pattern one of the motors will vibrate to guide the user to move in the direction of the vibration. In another directional pattern example, multiple motors will vibrate in a wave pattern to guide the user to the direction of the last vibrating motor. For a rotational pattern, the motors will vibrate sequentially and the vibrations represent an instruction to a user of the tactile belt to rotate around self. In some embodiments, the belt includes eight motors for providing four cardinal directions (north, south, east, west) and four intermediate directions (northwest, southwest, southeast, northeast). Other numbers of motors are possible, for example, four, sixteen, etc.

The system is particularly advantageous in numerous respects. First, the system provides a device that is unobtrusive, but large enough to provide detailed information about directions. Second, the system can be used to navigate different areas including the outdoors, which helps visually-impaired people access places that were previously too complex to navigate.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION

Figure 1:
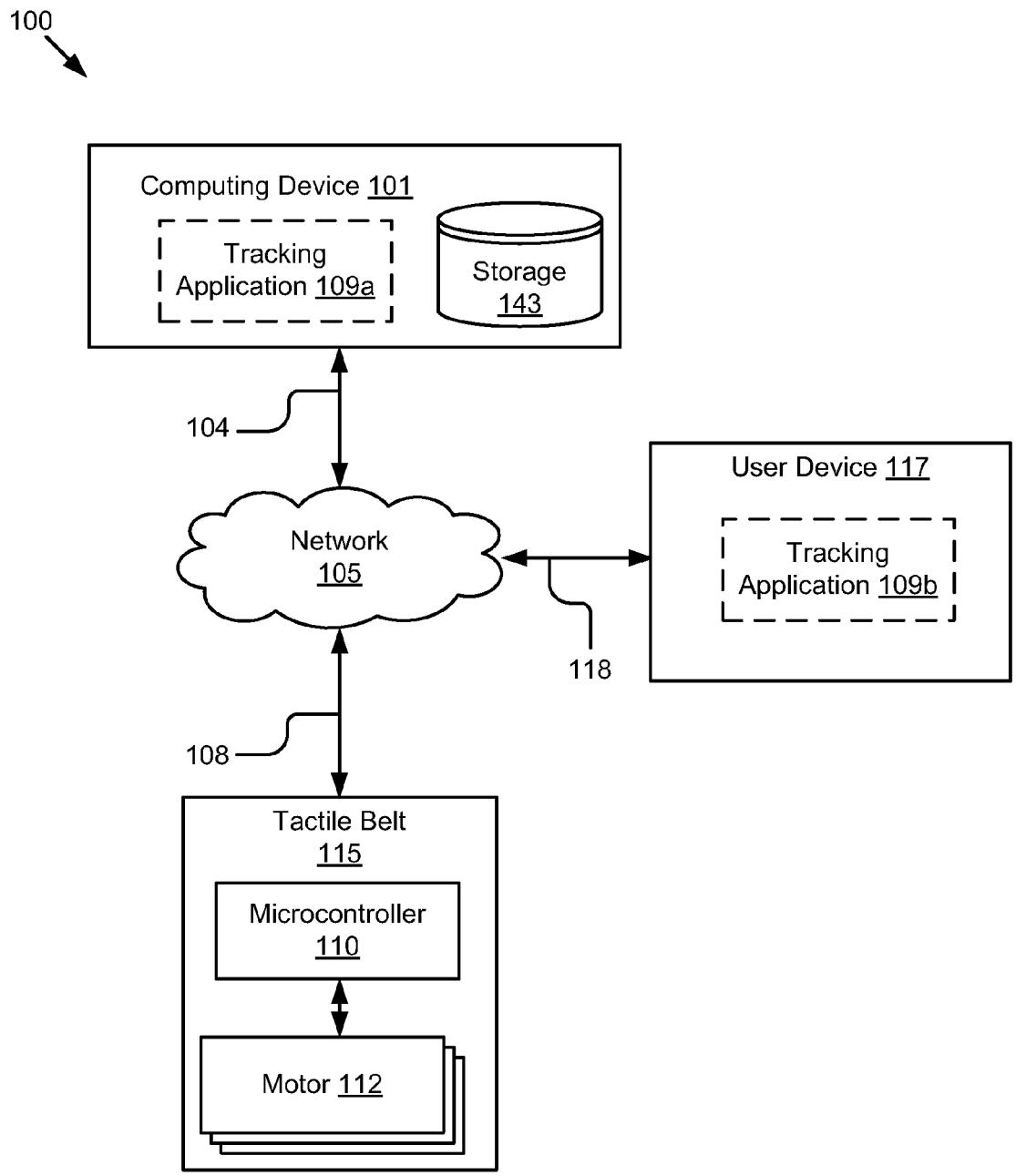
FIG. 1 is a high-level block diagram illustrating one embodiment of a system for providing navigation guidance.

A system and method for providing navigation guidance are described below. In the following description, for purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to client devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for providing navigation guidance according to one embodiment. The illustrated system 100 includes a computing device 101, a tactile belt 115 and a user device 117 that are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the computing device 101 and the tactile belt 115, in practice one or more networks 105 can be connected to these entities.

The computing device 101 comprises a tracking application 109a and storage 143. In one embodiment the computing device 101 is a mobile device that tracks the position of a user and moves with the user. For example, the computing device 101 is a robot that travels with the user indoors or outdoors. In another embodiment, the computing device 101 is a stationary device for tracking a position of the user in a confined space. For example, the confined space is a cluttered room and the computing device 101 uses hardware such as a laser scanner to determine the position of the user.

The computing device 101 is connected to the network 105 via signal line 104 and communicates wirelessly with the tactile belt 115 or the user device 117. For example, the computing device 101 can be a mobile device that moves along with the tactile belt 115 through multiple indoor rooms or in the outdoors. In another embodiment, the computing device 101 includes a speaker for generating audio loud enough that the user can hear it and interpret directions generated by the tracking application 109a.

In one embodiment, the tracking application 109b is operable on a user device 117. The user device 117 is a computing device that includes a memory and a processor, for example a music player, a tablet computer, a mobile telephone or a personal digital assistant (PDA). The user device 117 includes speakers for generating audio that the user can hear for providing directions. In some embodiments, the user device 117 includes headphones so that the user can listen to the directions without disturbing other people.

In some embodiments, the tracking application 109 is stored in part on the user device 117 and in part on the computing device. For example, the tracking application 109b on the user device 117 is a thin-client application for generating audio for directions that were created by the tracking application 109a on the computing device 101.

The tracking application 109 is code and routines for tracking the location of the user, determining where the user should move and transmitting directions to the user. The directions can be audio directions or haptic directions provided by a vibration pattern that is generated by the tactile belt 115. In some embodiments, the tracking application 109 tracks the movement of the tactile belt 115 to determine whether the user followed the directions and, if not, the tracking application 109 modifies at least one setting for the directions. For example, the tracking application 109 modifies the timing of the vibrations to occur when the tactile belt 115 is closer or farther away from objects. In another example, the tracking application 109 uses different patterns to provide guidance, for example, a longer vibration, more use of rotations, etc.

The tactile belt 115 comprises a belt harness, a microcontroller 110 and motors 112. The belt harness is made of an elastic material, for example rubber woven in with cloth. The elastic material helps secure the motors 112 into the belt harness and keeps them in fixed positions because the angles between the motors remain static regardless of how much the elastic is flexed. The number of motors 112 can vary. The number should be chosen based on having enough motors 112 to provide enough direction, but not so many that the user has trouble determining which motor 112 is vibrating. For example, four motors 112 provide four cardinal directions and, for some purposes, possibly lack granularity. Eight motors provides four cardinal directions and four intermediate motors 112.

The belt harness can be covered with material to make it more aesthetically pleasing. For example, the belt harness could be glued to leather and a belt buckle could be added. While FIG. 1 illustrates one tactile belt 115, the disclosure could apply to a system architecture having one or more tactile belts 115.

In one embodiment, the tactile belt 115 obtains power and data from the computing device 101 via a RS-232 serial port that is connected to the tactile belt 115. The tactile belt 115 further includes an internal USB-to-serial converter. Persons of ordinary skill in the art will recognize that other connectors are possible, for example, a USB, a mini-USB, etc.

In another embodiment, the tactile belt 115 includes a communication unit for wirelessly communicating data to and from the computing device 101. For example, the communication unit uses Bluetooth to communicate data including the location of the tactile belt 115. In another embodiment, the location of the tactile belt 115 is determined through a global positioning system (GPS), radio-frequency identification (RFID), etc.

The microcontroller 110 is a computing device implemented on a single integrated circuit that includes a processor, a memory and one or more programmable input/output peripherals. In some embodiments, the microcontroller 110 includes one or more embedded memories (e.g., a static random access memory (SRAM), an electrically erasable programmable read-only memory (EEPROM), a flash memory, etc.). For example, the microcontroller 110 is an Arduino Uno, which is a version of the Arduino Open Source hardware platform.

The microcontroller 110 receives a message from the tracking application 109. For example, the tracking application 109 could transmit a Robotics Operating System (ROS) message to the microcontroller 110. The message comprises a bit sequence and a vibration intensity value for each of the motors 112 (e.g. for eight motors). Each bit in the bit sequence indicates if the motor is going to vibrate or not during the corresponding time interval. The time interval could be any amount, for example, $\frac{1}{16}$ seconds. The bit sequences for each motor are read sequentially according to the time interval (e.g. every $\frac{1}{16}$ seconds). If the bit is 1, the corresponding motor 112 vibrates with specified intensity; if the bit is 0, the corresponding motor 112 does not vibrate. The bit sequence and the vibration intensity values form a vibration pattern, which incorporates the activation frequency, duration and rhythm of vibrations for all motors.

In some examples, the microcontroller 110 includes one or more general purpose input/output (GPIO) pins, each configurable to either an input state or an output state. For example, a first GPIO pin in the microcontroller 110 can be configured to an output state to drive a first motor 112; a second GPIO pin can be configured to an input state to drive a second GIPO pin, etc. The microcontroller 110 may include other components for providing the functionality described herein.

The microcontroller 110 applies corresponding sequences of voltages to the motors 112. For example, the microcontroller 110 uses pin switching on eight of the digital output pins in the main loop (where the eight motors are used) to provide Pulse Width Modulation. In some embodiments, the vibration intensities are achieved by PWM at 10-30 kHz, e.g. 20 kHz. Since the motors 112 are actuated in the main loop, the vibrations are synchronous. In some embodiments, the microcontroller 110 drives the motors with a ULN2803A chip, which can drive up to eight motors.

In some embodiments, each motor 112 is attached to a light-emitting diode (LED) for debugging purposes. For example, when the motor 112 is working, the LED is green. When the motor 112 is experiencing a problem, the LED is red. In another embodiment, the motors 112 vibrate in a pattern that is dissimilar to the vibration pattern to signal a problem with at least one of the motors. For example, the motors 112 vibrate in the save our ship (SOS) Morse code pattern. This could be advantageous to signify to visually-challenged users that there is a problem with a motor.

The tracking application 109 is useful for guiding people that are visually impaired. For example, people that are blind, firefighters in a smoky building, police navigating a space in the dark, etc. The tactile belt 115 could be used in other situations, for example, to help people with dementia who get easily confused with directions and/or objects.

Example Tracking Application

Figure 2:
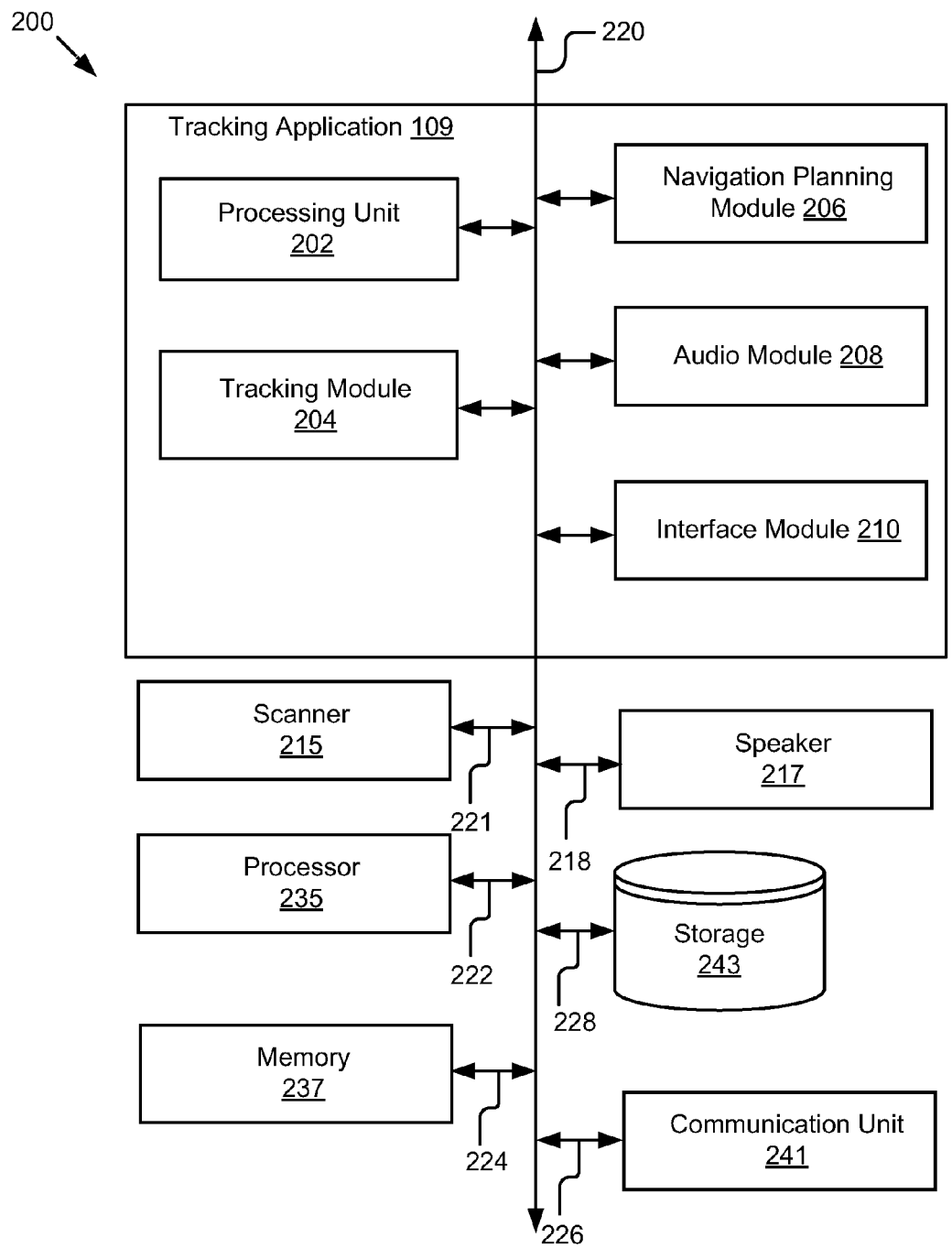
FIG. 2 is a block diagram illustrating one embodiment of a tracking application.

Referring now to FIG. 2, an example of the tracking application 109 is shown in more detail. FIG. 2 is a block diagram of a computing device 200 that includes a tracking application 109, optionally a scanner 215, a speaker 217, a processor 235, a memory 237, a communication unit 241 and a storage device 143 according to some examples. In some embodiments, the computing device 200 is computing device 101 and storage device 243 is storage device 143. In another embodiment, some or all parts of the device 101 are the user device 117. The components of the computing device 101 are communicatively coupled by a bus 220.

The scanner 215 is hardware for tracking a position and orientation of a user and for tracking the position and orientation of objects. For example, the scanner 215 could be a UTM-30LX-EW laser scanner made by Hokuyo. The UTM-30LX-EW laser scanner tracks the position and orientation of the user and objects at 30 Hz. In another embodiment, the scanner 215 is a motion sensing input device, such as Microsoft® Kinect. The scanner 215 captures images of the user and objects and transmits the images to the tracking application 109. In some embodiments, the scanner 215 can be manipulated by an administrator to change the angle for capturing images. The scanner 215 is connected to the bus 220 via signal line 221.

In some embodiment the computing device 101 is a mobile computing device 101. For example, the computing device 101 is a robot. The robot moves in the environment and freely explores unknown places while keeping the tactile belt 115 in the scanner's 215 field of view. The scanner 215 captures images of the tactile belt 115 and the objects at different distances, and transmits the data along with the distance traveled by the computing device 101 to get a better depth perspective.

The speaker 217 is hardware for generating sound in response to an electrical audio signal input. The speaker 217 receives audio from the tracking application 109 and generates the audio. For example, the tracking application 109 generates directions for the user to go forward for two steps and then turn right to avoid an object. The speaker 217 generates the audio.

The processor 235 includes an arithmetic logic unit, a microprocessor, a general purpose controller or some other processor array to perform computations and provide electronic display signals to a display device. The processor 235 is coupled to the bus 220 for communication with the other components via signal line 222. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 stores instructions and/or data that can be executed by the processor 235. The memory 237 is coupled to the bus 220 for communication with the other components via signal line 224. The instructions and/or data may include code for performing the techniques described herein. The memory 237 may be a dynamic random access memory (DRAM) device, a static random access memory (SRAM) device, flash memory or some other memory device. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 transmits and receives data to and from the tactile belt 115 or the user device 117. In some embodiments, the communication unit 241 transmits data to the tactile belt 115, but does not receive data from the tactile belt 115. The communication unit 241 is coupled to the bus 220 via signal line 226. In some embodiments, the communication unit 241 includes a port for direct physical connection to the network 105 or to another communication channel. For example, the communication unit 241 includes an RS-232, USB, SD, CAT-5 or similar port for wired communication with the client device 115. In some embodiments, the communication unit 241 includes a wireless transceiver for exchanging data with the tactile belt 115 or other communication channels using one or more wireless communication methods, including IEEE 802.11, IEEE 802.16, BLUETOOTH® or another suitable wireless communication method.

In some embodiments, the communication unit 241 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the communication unit 241 includes a wired port and a wireless transceiver. The communication unit 241 also provides other conventional connections to the network 105 for distribution of files and/or media objects using standard network protocols including TCP/IP, HTTP, HTTPS and SMTP, etc.

The storage device 243 can be a non-transitory memory that stores data for providing the functionality described herein. The storage device 243 may be a dynamic random access memory (DRAM) device, a static random access memory (SRAM) device, flash memory or some other memory devices. In some embodiments, the storage device 143 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the storage device 243 is communicatively coupled to the bus 220 via signal line 228. In one embodiment, the storage device 243 stores the location of the user, directions (e.g. vibration patterns provided to the tactile belt 115 or audio for the speaker 217) and outcomes based on the directions. For example, if the tracking application 109 provides a vibrational patterns to the tactile belt 115 that includes an instruction to move north and the user of the tactile belt 115 bumps into an object, the storage 143 includes the user's location, the instructions, the timing information and modifications made by the tracking application 109 to change one of the settings to better guide the user. In some embodiments, the storage device 143 may store other data for providing the functionality described herein.

In the illustrated embodiment shown in FIG. 2, the tracking application 109 includes a processing unit 202, a tracking module 204, a navigation planning module 206, an audio module 208 and an interface module 210. The components of the tracking application 109 are communicatively coupled via the bus 220.

The processing unit 202 can be software including routines for handling communications between the tracking application 109 and other components of the computing device 200. In one embodiment, the processing unit 202 can be a set of instructions executable by the processor 235 to provide the functionality described below for handling communications between the tracking application 109 and other components of the computing device 200. In another embodiment, the processing unit 202 can be stored in the memory 237 of the computing device 200 and can be accessible and executable by the processor 235. In either embodiment, the processing unit 202 can be adapted for cooperation and communication with the processor 235 and other components of the computing device 200.

In one embodiment, the processing unit 202 receives data about the location of the user from the scanner 215. In another embodiment, the processing unit 202 receives data about the location of the user from the communication unit 241. The processing unit 202 sends data to the tactile belt 115 or the user device 117 via the communication unit 241. In another embodiment, the processing unit 202 receives user input associated with a user interface. The processing unit 202 transmits the user input to the tracking module 204 or the interface module 210, depending on the type of user input. For example, if the administrator identified the user in an image, the processing unit 202 transmits the user input to the tracking module 204.

The tracking module 204 can be software including routines for determining a location of the user, the computing device 101 and the location of objects in proximity to the user. In one embodiment, the tracking module 204 can be a set of instructions executable by the processor 235 to provide the functionality described below for determining a location of the user, the computing device 101 and the location of objects as a function of time. In another embodiment, the tracking module 204 can be stored in the memory 237 of the computing device 200 and can be accessible and executable by the processor 235. In either embodiment, the tracking module 204 can be adapted for cooperation and communication with the processor 235 and other components of the computing device 200.

In one embodiment, the tracking module 204 receives images of the user and objects in proximity to the user from the scanner 215 via the processing unit 202. Each image is associated with a time of capture (e.g., a timestamp). The tracking module 204 uses the images of the user and objects in proximity to the user to determine the coordinate location of the user and the objects. For example, the tracking module 204 determines the distance between objects.

In the embodiment where the computing device 101 is mobile and the scanner 215 provides multiple images and a distance traveled, the tracking module 204 uses the images and the distance traveled to determine the distance between objects. The tracking module 204 determines the location of the computing device 101 based on global positioning system (GPS) coordinates, triangulation, etc. In some embodiments, the tracking module 204 determines the path and speed of the user. For example, the tracking module 204 determines that the user is moving 79 degrees at 2.5 miles per hour. In some embodiments, the tracking module 204 tracks the distance of the user between objects and the distance of the computing device 101 (e.g. the robot) between objects.

In one embodiment, the tracking module 204 instructs the interface module 210 to generate a user interface for an administrator to identify for and confirm the user in the image. For example, the user interface includes an image of the user and the objects, and the user interface asks the administrator to click on the user. The tracking module 204 receives the user input and tracks the movement of the user in subsequent frames based on the user input. The path may also be frequently updated as the tracking module 204 receives updated information about the position of the user.

The navigation planning module 206 can be software including routines for determining a path for the user and the computing device 101, generating linear and angular velocities for the paths and generating directions for the user and the computing device 101. In one embodiment, the navigation planning module 206 can be a set of instructions executable by the processor 235 to provide the functionality described below for determining a path for the user and the computing device 101, generating linear and angular velocities and generating directions. In another embodiment, the navigation planning module 206 can be stored in the memory 237 of the computing device 200 and can be accessible and executable by the processor 235. In either embodiment, the navigation planning module 206 can be adapted for cooperation and communication with the processor 235 and other components of the computing device 200.

The navigation planning module 206 determines a first path to avoid at least one object in proximity to the user. In one embodiment, the navigation planning module 206 models the user as a non-holonimic robot with a circular footprint and uses a robot operating system (ROS) navigation stack for path planning, which provides local planning algorithms for mobile robots. The path is planned in time increments, for example, every 500 milliseconds (ms), every 100 ms, every second, etc.

The navigation planning module 206 determines a second path for the computing device 101. The navigation planning module 206 designs the path so that the computing device 101 can keep the user in the field of view of the scanner 215. The navigation planning module 206 also determines a path for avoiding obstacles in the user's path.

The navigation planning module 206 determines linear and angular velocities based on the paths that the user and the computing device 101 should execute to stay on the course of the paths. For example, the navigation planning module 206 determines that the user could walk between two objects to avoid a collision and determines linear and angular velocities from the user's current position of the end destination between the two objects. For the computing device 101, the navigation planning module 206 selects a velocity that is not too fast or too slow to keep an optimal view of the user.

There are three different ways to provide instructions to the user: audio generated by the computing device 101, audio generated by the user device 117 or vibrations generated by the tactile belt 115. The audio generated by the computing device 101 or the user device 117 can be the same type of directions. The navigational planning module 206 generate directions for the user that include instructions for moving in a certain direction. For example, the directions include moving forward, backward, to the left, to the right, etc. for a certain period of time or distance (e.g. move forward for five seconds or move two feet to the right). In some embodiments where an obstacle is too close for the user to avoid it by changing direction, the navigational planning module 206 uses a threshold distance to determine whether to instruct the user to turn around. For example, where an object is less than two feet from the user, the navigational planning module 206 provides directions for turning around.

In the instances where the navigational planning module 206 generates directions for the tactile belt 115, the navigational planning module 206 generates vibrational patterns from directional patterns and/or rotational patterns that are transmitted to a tactile belt 115. The navigational planning module 206 uses a threshold distance to determine whether the vibration pattern should be a directional pattern or a rotational pattern. A directional pattern is an instruction to navigate towards a direction, for example, north, south, east, west, northeast, southeast, southwest, northwest, etc. A rotational pattern is an instruction for the user to rotate around self, which means to rotate the user's body to a direction before moving. For example, the user rotates 180 degrees to avoid an object. If the distance is less than a threshold distance, the navigation planning module 206 selects a rotational pattern. For example, if the user is less than a foot away from an object, the navigation planning module 206 selects the rotational pattern. If the distance is greater than a threshold distance, the navigation planning module 206 selects a directional pattern. For example, if the user is five feet away from an object, the navigation planning module 206 determines that there is enough time for the user to avoid the object by changing the direction of the user's path.

Figure 3A:
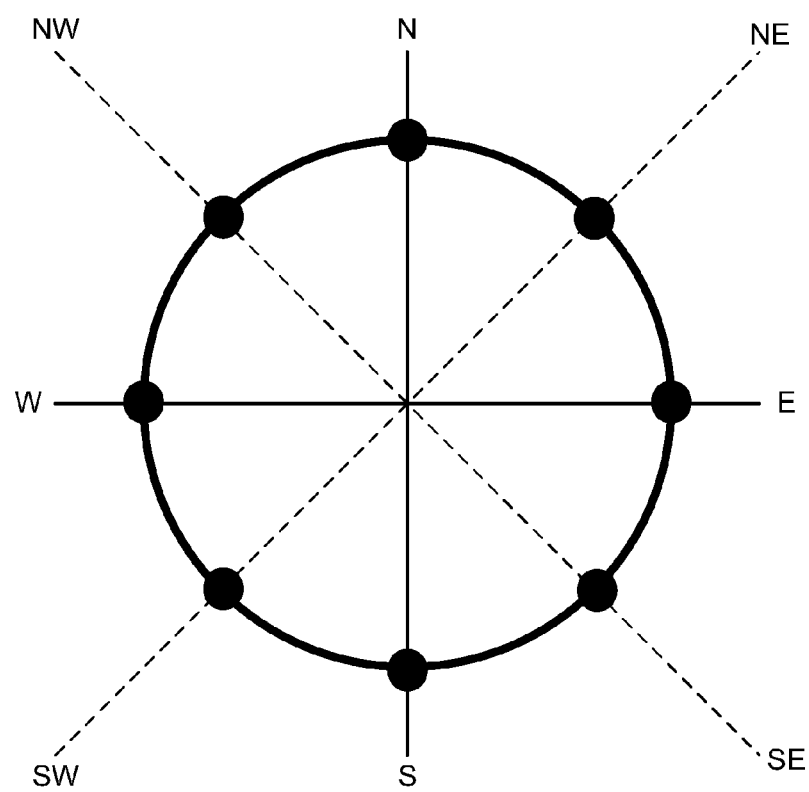
FIG. 3A is a graphic representation illustrating one embodiment of the position of motors on the tactile belt.

Turning now to FIG. 3A, a graphic representation 300 of one embodiment of the position of motors on the tactile belt 115 is illustrated. The graphic representation 300 is a top down perspective of one example of a tactile belt 115 with eight motors 112. Because the motors 112 are in a fixed position in the belt, they can represent cardinal directions and intermediate directions. In this example, the belt includes eight motors 112 for providing four cardinal directions (north, south, east, west) and four intermediate directions (northwest, southwest, southeast, northeast).

Figure 3B:
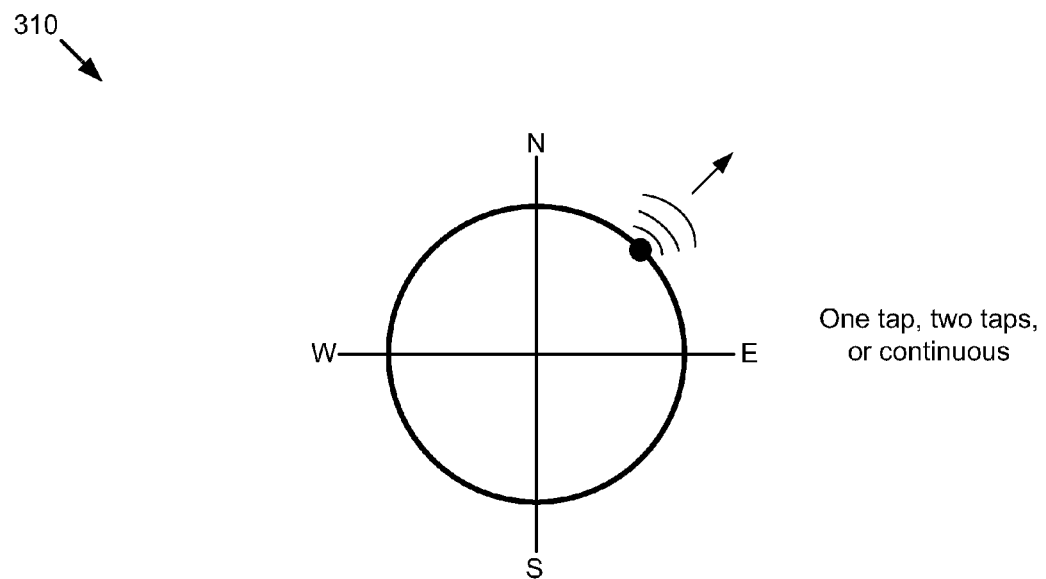
FIG. 3B is a graphic representation illustrating one embodiment of a tactile belt for providing guidance based on vibration from one motor.
Figure 3C:
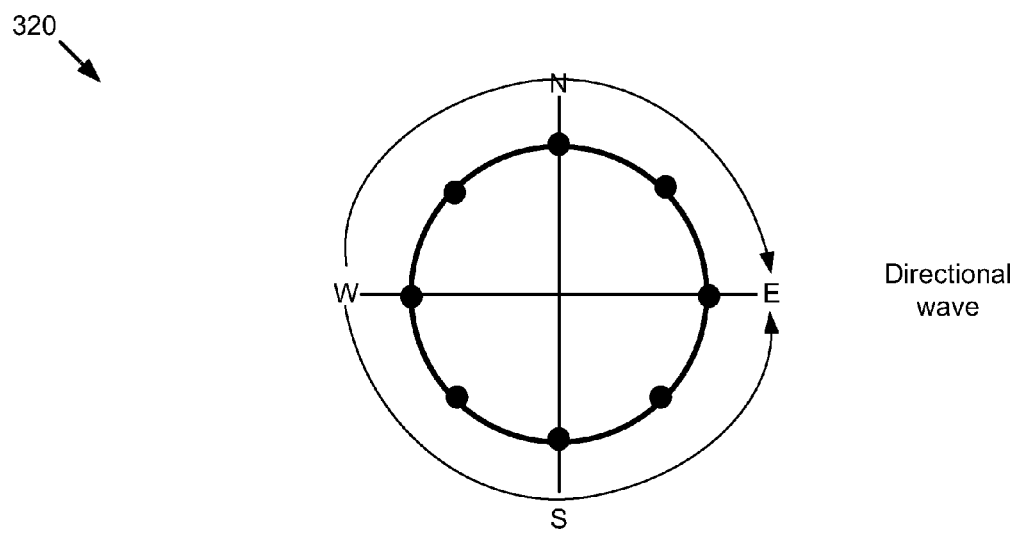
FIG. 3C is a graphic representation illustrating one embodiment of a tactile belt for providing guidance based on vibrations from multiple motors to form a directional wave.

FIGS. 3B and 3C illustrate different types of directional patterns. FIG. 3B illustrates a directional pattern 310 that uses one motor 112. When the motor 112 vibrates, the user knows to move in the direction of the vibration. The pattern can take many forms including a one tap vibration, a two tap vibration or continuous vibration. One tap vibration includes a short vibration that is perceived as a tap (as opposed to continuous vibration). For example, one tap vibration could include activating a motor 112 for a time interval, for example, 250 ms.

One tap vibration may be too short for some users to notice. Another option is to use two tap vibration. For example, the motor 112 vibrates for a first time interval (e.g. 250 ms), the motor stops vibrating for a second time interval (e.g. 250 ms), then the motor 112 vibrates for a third time interval (e.g. 250 ms). Yet another option is to have the motor vibrate continuously until an end of the vibration pattern (e.g., when new pattern is received). In some embodiments, the default setting for the directional pattern using one motor is to apply two tap vibration because it achieves a balance of being enough sensation that the user notices the instruction, but not so much sensation that the user finds it overwhelming.

FIG. 3C illustrates a directional pattern 320 that uses multiple motors 112 to provide instructions for moving in a direction. The vibration pattern is a directional wave for the motors to vibrate sequentially and a last motor 112 in the sequence represents an instruction to a user of the tactile belt to move in the direction of the last motor 112. In the illustrated example, the motors 112 vibrate sequentially from west to east to indicate that the user should move east. The pattern for the directional wave can take many forms. For example, each motor 112 in each path could vibrate for a time interval such as 250 ms. For example, first the motor 112 for the western direction vibrates, then the motor 112 for the northwestern direction and the motor 112 for the southwestern direction vibrate, then the motor 112 for the northern direction and the motor 112 for the southern direction vibrate, etc. In another example, the motors 112 have overlapping timing to reduce the time for providing the instruction. For example, the motor 112 for the western direction vibrates for 250 ms during at least a portion of which the motors 112 for the southwestern direction 112 and the northwestern direction vibrate for 125 ms each, etc.

Figure 3D:
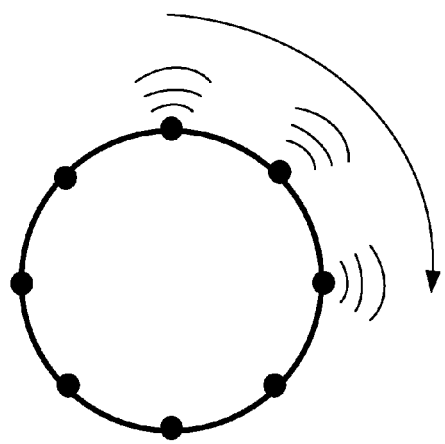
FIG. 3D is a graphic representation illustrating one embodiment of a tactile belt for providing guidance based on vibrations from a single rotation.
Figure 3E:
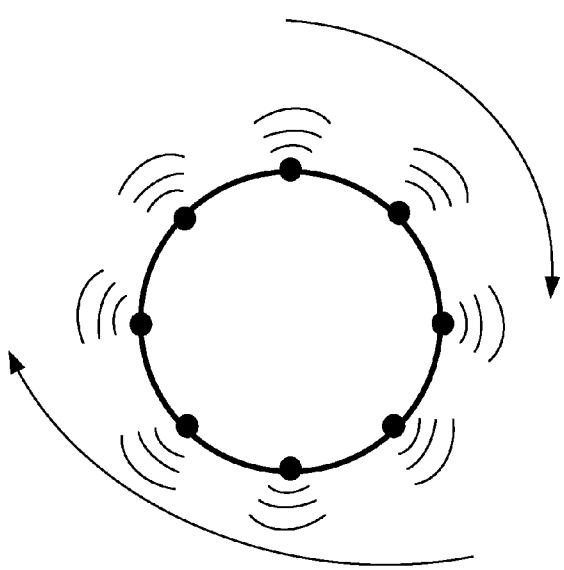
FIG. 3E is a graphic representation illustrating one embodiment of a tactile belt for providing guidance based on vibrations from a double rotation.

FIGS. 3D and 3E illustrate different types of rotational patterns. FIG. 3D illustrates a single rotation 330 that could be a solo once rotational motion or a dual once rotational motion. The solo once rotational motion involves activation of consecutive motors 112 for time intervals (e.g., 250 ms) of all motors 112 or a subset of the motors 112, for example, half of the motors. The solo once rotational motion stops vibrating after one full rotation around the belt. For example, the vibration starts with the motor 112 in the northern direction and ends with the motor 112 at the northwestern direction. The dual once rotational motion is executed for one full rotation with two opposing sequences of motors 112 instead of one. For example, a first vibration rotation starts with the motor 112 in the northern direction and ends with the motor 112 at the northwestern direction and a second vibration rotation starts with the motor 112 in the northern direction and ends with the motor 112 at the northeastern direction.

FIG. 3E illustrates a continuous rotational motion 340 that could be a solo continuous pattern or a dual continuous pattern. A continuous rotational motion occurs when the motors 112 repeat the rotational pattern until an end of the vibration pattern (e.g., when a new pattern is received). The arrows in FIG. 3E represent that the motors 112 continue to vibrate instead of stopping after a full rotation as the motors 112 do during a single rotation. A solo continuous rotational motion pattern rotates in one direction. A dual continuous rotational motion pattern rotates in two different directions.

In one embodiment, the vibrational pattern includes a stop instruction to inform the user that the goal was successfully accomplished. For example, all motors 112 vibrate for a period of time (e.g. 250 ms, 500 ms, etc.) to indicate that the user should stop moving. In one example, the stop signal is implemented similar to the two taps instruction, except that all of the motors 112 are activated instead of one.

The navigation planning module 206 converts the linear and angular velocities to a vibrational pattern that comprises at least one of the directional patterns and the rotational patterns. In some embodiments, the navigation planning module 206 receives the location of the user and the location of the objects and in addition to determining a vibrational pattern for avoiding objects in close proximity to the user's current location, the navigation planning module 206 predicts a path based on historical data and current data. For example, if the route is limited to a single room, the navigation planning module 206 determines that each morning the user of the tactile belt 115 enters the room, goes to the refrigerator (e.g., to retrieve a drink) and then moves to sit down on a chair at a desk. The navigation planning module 206 uses this historical data in combination with information about current objects in the room to generate the vibration pattern. The information about current objects is important because in this example, people could rearrange the position of the desk or other objects in the room.

In another example where the user and the computing device 101 are used outside, the navigation planning module 206 determines the user's historical path for walking from home to work every morning. For example, if the user always turns right on A Street in the morning, the navigation planning module 206 generates directions that anticipate that the user will want to turn right on A Street around the same time on the subsequent day. The navigation planning module 206 will also modify the directions to include new objects, such as moving cars and people.

In some embodiments, the navigation planning module 206 determines a path for a user based on the user's instructions. For example, the user requests a path to get from Building 1 to Building 2. In some embodiments, the navigation planning module 206 uses mapping software in conjunction with the above-described methods to determine a path to guide the user from Building 1 to Building 2.

In one embodiment, the navigation planning module 206 determines a path for the user and a path for the computing device 101 (e.g., the robot). This advantageously provides a system where the navigation planning module 206 can dynamically evaluate both paths for current or expected dangers. For example, the path for the computing device 101 includes exploring an area before the user reaches it to identify the location of objects. The navigation planning module 206 then generates a path for the user for avoiding the objects.

In one embodiment, the navigation planning module 206 receives feedback about the user's reaction to the directions and modifies at least one setting for the directions. Modifications include modifying the threshold value, changing the timing of the directions and changing the type of directional or rotational pattern. For example, if the threshold is to provide a directional pattern within two feet of an object and the user still bumps into the object, the navigation planning module 206 makes the threshold three feet. In another example, if the user does not move in the instructed direction after receiving a directional pattern with one tap, the navigation planning module 206 changes it to a two-tap directional pattern and, if the user does not respond, continuous vibration. In yet another example, if the user does not respond to the one tap or two tap vibration, the navigational planning module 206 uses a directional wave.

In some embodiments, the navigation planning module 206 uses a weighted sum of historical paths to determine whether to modify at least one setting for the directions. For example, if the user responds correctly to a vibrational pattern 10 times and then responds incorrectly the eleventh time, the navigation planning module 206 does not change the vibrational pattern setting. However, if the user responds incorrectly the next 11 to 15 times, the navigation planning module 206 modifies at least one setting for the vibrational pattern.

The audio module 208 can be software including routines for receiving directions from the navigation planning module 206 and generating audio. In one embodiment, the audio module 208 can be a set of instructions executable by the processor 235 to provide the functionality describes below for generating audio. In another embodiment, the audio module 208 can be stored in the memory 237 of the computing device 200 and can be accessible and executable by the processor 235. In either embodiment, the audio module 208 can be adapted for cooperation and communication with the processor 235 and other components of the computing device 200.

The audio module 208 receives directions from the navigation planning module 206 and converts the directions (i.e. text) to speech. In one embodiment, the navigation planning module 206 matches the text (e.g. walk three steps and turn right) to phonetic transcriptions to each word and makes the text into prosodic units, like phrases, clauses and sentences. The audio module 208 then converts the symbolic linguistic representation into sound. In one embodiment, the audio module 208 generates the audio by concatenating pieces of recorded speech that are stored in the storage 243 and generates an audio file. The audio can be saved in a variety of file formats, such as waveform audio file format (WAVE), MPEG layer III audio (MP3), etc. The audio module 208 transmits the audio file to the user device 117 via the communication unit 241 or the speaker 217.

The interface module 210 can be software including routines for generating a user interfaces for an administrator and for generating a message that incorporates the directions from the navigation planning module 206. In one embodiment, the interface module 210 can be a set of instructions executable by the processor 235 to provide the functionality described below for generating user interfaces and messages. In another embodiment, the interface module 210 can be stored in the memory 237 of the computing device 200 and can be accessible and executable by the processor 235. In either embodiment, the interface module 210 can be adapted for cooperation and communication with the processor 235 and other components of the computing device 200.

In one embodiment, the interface module 210 receives instructions from the tracking module 204 to generate a user interface for an administrator to identify the user and/or objects in an image captured by the scanner 215. The interface module 210 transmits the user interface to the administrator via the communication unit 241. In some embodiments, the computing device 101 includes a display for the administrator to view the user interface. In other embodiments, the administrator uses a separate user device to view the user interface and provide responses.

In some embodiments, the interface module 210 generates a user interface for the user of the tactile belt 115 or the user device 117. The user interface allows the user to modify settings for the tactile belt 115, request a vibrational pattern that includes directions, modify the volume setting for the user device 117, etc. The user can modify settings, such as the timing of the directions (e.g., the timing for following an audio direction or a vibrational pattern), the type of vibrational pattern (e.g., solo, double tap, continuous) and the threshold for switching from instructing the user to move in direction to turning around or switching from a directional pattern to a rotational pattern. The user interface could be used directly by the user of the tactile belt 115 or the user device 117, or by an administrator that configures the user interface on behalf of the user.

The interface module 210 also generates messages for the tactile belt 115. In one embodiment, the interface module 210 generates ROS messages that comprise a bit sequence and a vibration intensity value for each of the motors 112 for each step in the vibration pattern. It is advantageous to keep the message simple so that the system is compatible with a variety of tactile belt 115 designs.

Methods

Figure 4A:
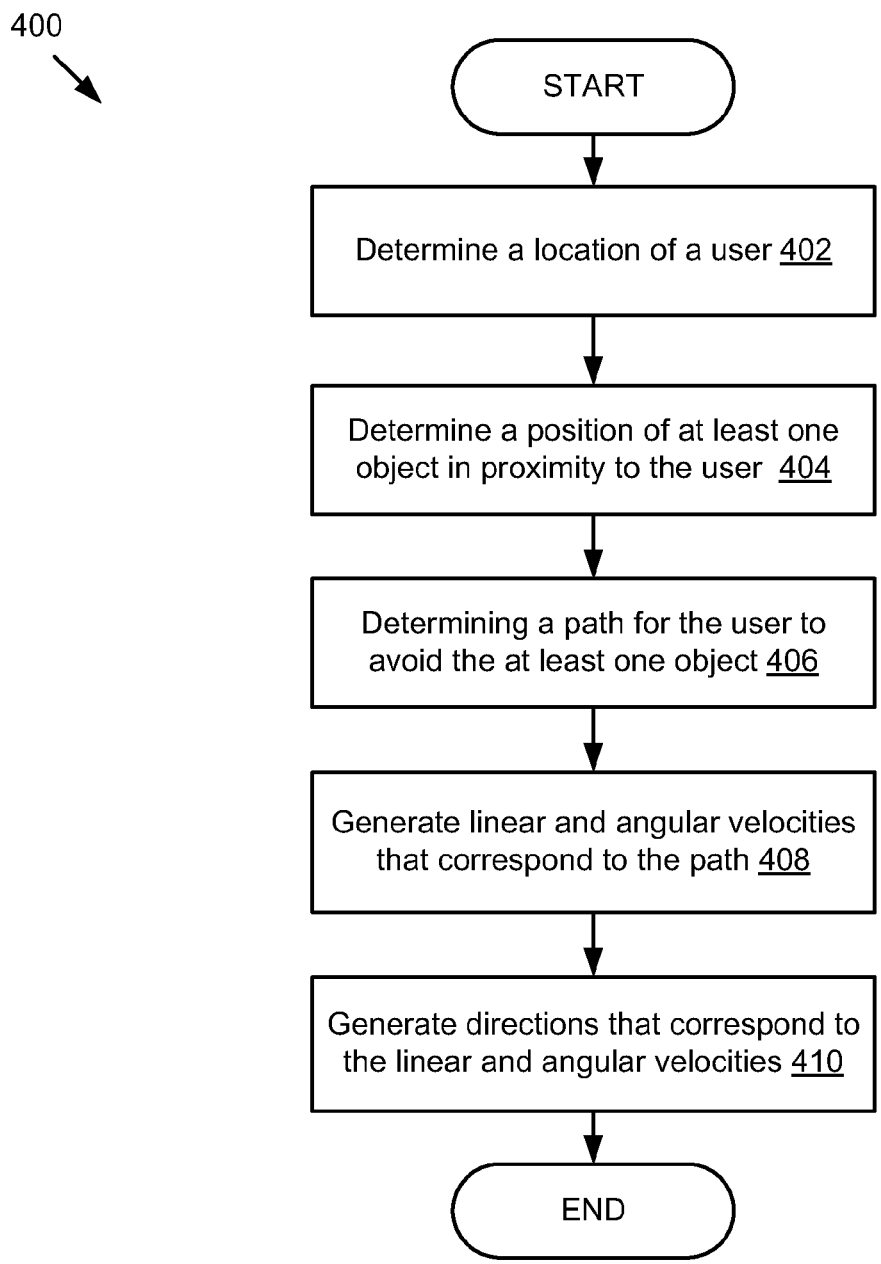
FIG. 4A is a flow diagram of one embodiment of a method for tracking a user's movement and providing navigation guidance.

FIG. 4A is a flow diagram of one embodiment of a method 400 for tracking a user's movement and providing navigation guidance. In one embodiment, a tracking application comprises a tracking module 204 and a navigation planning module 206. The tracking module 204 determines 402 a location of a user. For example, the tracking module 204 receives images of the user from a scanner 215 and a time that the image was captured by the scanner 215. The tracking module 204 determines 404 a position of at least one object in proximity to the user.

The navigation planning module 206 receives the distances between the user and the at least one object from the tracking module 204. The navigation planning module 206 determines 406 a path for the user to avoid the at least one object. For example, the navigation planning module 206 uses the ROS navigation stack for path planning that divides the steps into half second increments. The navigation module 206 generates 408 linear and angular velocities that correspond to the path. The navigation module 206 generates 410 direction that correspond to the linear and angular velocities. For example, the directions instruct the user to move in a certain direction or turn around. In another example, the directions are a vibrational pattern. The vibrational pattern includes at least one of a directional pattern for navigating towards a direction and rotational pattern for rotating around self.

Figure 4B:
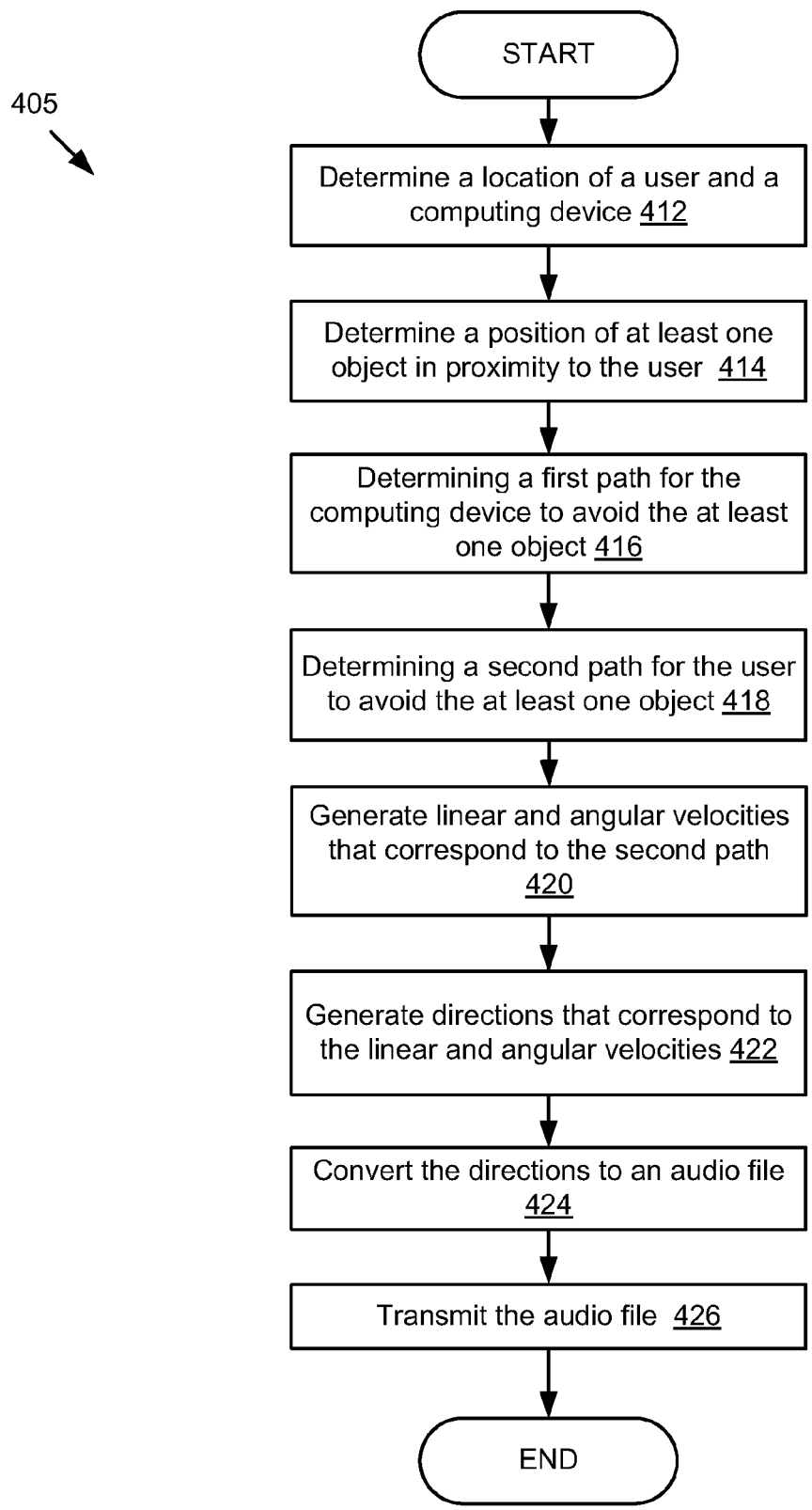
FIG. 4B is a flow diagram of a method for tracking a user's movement and providing audio directions.

FIG. 4B is a flow diagram of one embodiment of a method 405 for tracking a user's movement and providing navigation guidance. In one embodiment, a tracking application comprises a tracking module 204, a navigation planning module 206 and an audio module 208. The tracking module 204 determines 412 a location of a user and the computing device 101. For example, the tracking module 204 receives images of the user from a scanner 215 and a time that the image was captured by the scanner 215. The tracking module 204 determines 404 a position of at least one object in proximity to the user. For example, the tracking module 204 uses the image from the scanner 215 to determine a distance between the user and the objects. In some examples, the computing device 101 moves in the space and the tracking module 204 receives multiple images from the scanner 215 at different distances.

The navigation planning module 206 receives the distances between the user and the at least one object from the tracking module 204. The navigation planning module 206 determines 416 a first path for the computing device 101 to avoid the at least one object. The navigation module 206 determines 408 a second path for the user to avoid the at least one object. The navigation module 206 generates 410 linear and angular velocities that correspond to the second path. The navigation module 206 generates 422 directions that correspond to the linear and angular velocities.

The audio module 208 converts 424 the directions to an audio file and transmits 426 the audio file. For example, the audio module 208 transmits the audio file to the user device 117 via the communication unit 241. In another embodiment, the audio module 208 transmits the audio file to the speaker 217.

Figure 5A:
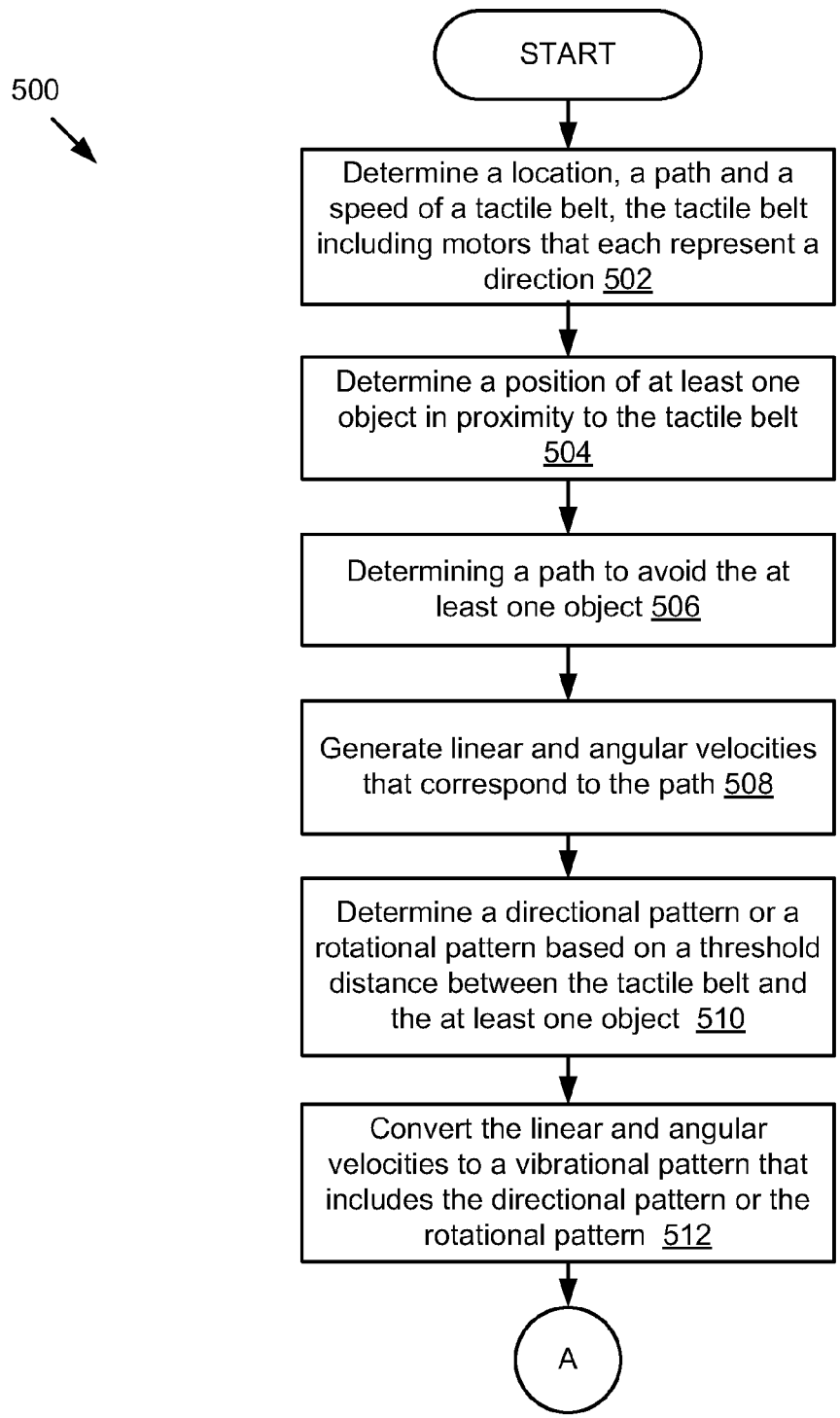
FIGS. 5A-5B are a flow diagram of one embodiment of a method for generating a vibrational pattern for a tactile belt.
Figure 5B:
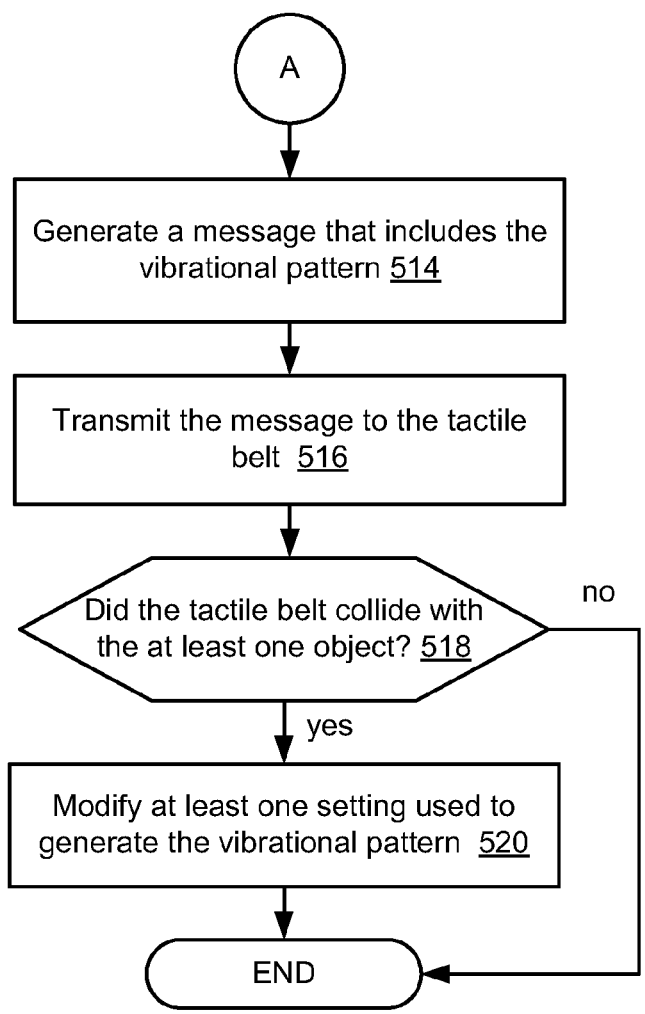

FIGS. 5A-5B are a flow diagram of another embodiment of a method for generating a vibrational pattern for a tactile belt 115. In one embodiment, a tracking application comprises a tracking module 204, a navigation planning module 206 and an interface module 210. The tracking module 204 determines 502 a location of a tactile belt 115, the tactile belt including motors 112 that each represent a direction. For example, the tracking module 204 determines the location after receiving images from the scanner 215 where the location of the tactile belt 115 was confirmed by an administrator. The images are also associated with a time and, in some examples, a distance traveled by the computing device 101 between images. The tracking module 204 determines 504 a position of at least one object in proximity to the tactile belt 115. For example, in an indoor setting the tracking module 204 determines the position of objects in an office. In an outdoor setting, the tracking module 204 determines the position of outdoor objects, such as bushes, lampposts and cars.

The tracking module 204 transmits the information to the navigation planning module 206, which determines 506 a path to avoid the at least one object. For example, the navigation planning module 206 determines a path to the user's desk. The navigation planning module 206 linear and angular velocities for the tactile belt 115 that correspond to the path. The navigation planning module 206 determines 510 a directional pattern or a rotational pattern based on a threshold distance between the tactile belt and the at least one object. For example, if the object is within two feet of the user, the user is too close to simply change direction. As a result, the navigation planning module 206 determines that the path should include the rotational pattern. The navigation planning module 206 converts 512 the linear and angular velocities to a vibrational pattern that includes the directional pattern or the rotational pattern. In one embodiment, the vibrational pattern includes multiple steps with a directional pattern or a rotation pattern at each step. For example, the vibration pattern includes a rotational pattern for an object near the tactile belt 115, then different directional patterns to avoid objects and to reach a destination.

The navigation planning module 206 transmits the vibration pattern to the interface module 210, which generates 514 a message that includes the vibrational pattern. For example, the message includes a bit sequence and a vibration intensity value for each of the motors 112. The interface module 210 transmits 516 the message to the tactile belt.

The navigation planning module 206 receives feedback. For example, the navigation planning module 206 receives additional images of the tactile belt 115 and the at least one object. The navigation planning module 206 determines 518 whether the tactile belt collides with the at least one object. If not, the method ends. If so, the navigation planning module 206 modifies 520 at least one setting used to generate the vibrational pattern. For example, if the user does not react to the vibration in enough time to avoid a collision, the navigation planning module 206 generates a vibrational pattern where the vibration occurs earlier in the sequence. In another example, in the same scenario the navigation planning module 206 changes the threshold for determining whether to select a directional pattern or a rotational pattern.

Figure 6:
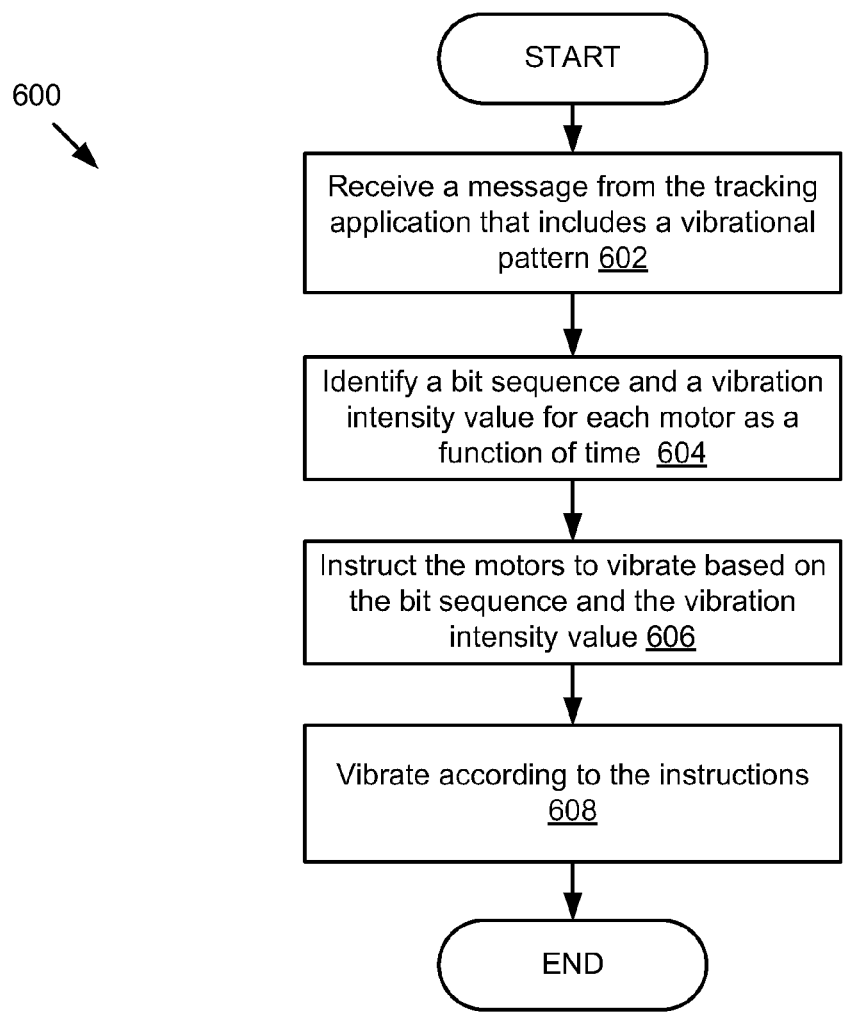
FIG. 6 is a flow diagram of one embodiment of a method for interpreting a vibrational pattern in a tactile belt.

FIG. 6 is a flow diagram of one embodiment of a method for interpreting a vibrational pattern in a tactile belt 115. The tactile belt 115 includes a microcontroller 110 and motors 112. For example, the tactile belt 115 includes eight motors 112 that represent four cardinal coordinates (north, south, east, west) and four intermediate coordinates (northwest, northeast, southwest, southeast). The microcontroller 110 receives 602 a message from the tracking application 109 that includes a vibrational pattern. The microcontroller 110 identifies 604 a bit sequence and a vibration intensity value for each motor as a function of time. For example, the vibrational pattern includes multiple steps and the bit sequence and vibration intensity value potentially applies to each of the eight motors 112 at each step. The microcontroller 110 instructs 606 the motors 112 to vibrate based on the bit sequence and the vibration intensity value. The motor 112 vibrates 608 according to the instructions.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
    determining a first path for a mobile computing device associated with a user to move within an environment;
    receiving image data from a scanner associated with the mobile computing device, the image data including one or more images of the user and one or more objects in the environment;
    determining, with one or more processors, a location of the user of a tactile belt using the image data;
    determining, with the one or more processors, a position of at least one object in proximity to the user using the image data;
    determining, with the one or more processors, a second path for the user to avoid the at least one object based on the location of the user and the position of the at least one object;
    generating, with the one or more processors, linear and angular velocities that correspond to the second path; and
    generating, with the one or more processors, directions that correspond to the linear and angular velocities by converting, with the one or more processors, the linear and angular velocities to a vibrational pattern for the tactile belt, the vibrational pattern including one or more of a directional pattern and a rotational pattern for vibrating one or more motors of the tactile belt.

2. The method of claim 1, further comprising:
    determining a location of the mobile computing device;
    determining the first path for the mobile computing device to avoid the at least one object;
    converting the directions to an audio file; and
    transmitting the audio file.

3. The method of claim 1, further comprising:
    predicting the vibrational pattern based on the user's historical path data and current path data.

4. The method of claim 1, wherein the one or more motors include a plurality of motors that vibrate as:
    a solo once rotational motion that represents activation of consecutive motors for a time interval and an end of vibration after a full rotation of the motors,
    a dual once rotational motion that represents a full rotation of the motors in two opposing directions, or
    a continuous rotational motion that repeats the solo once rotational motion or the dual once rotational motion continuously until an end of the vibrational pattern.

5. The method of claim 1, further comprising:
    determining whether the user is colliding with the at least one object; and
    responsive to the user colliding with the at least one object, modifying at least one setting used to generate the directions.

6. The method of claim 1, wherein determining the location of the user includes determining the location of the user based on the image data from the scanner associated with the mobile computing device.

7. The method of claim 1, wherein the mobile computing device captures the one or more images at different distances and determining the location of the user includes determining the location of the user based on the one or more images.

8. The method of claim 1, further comprising:
    generating a message that includes the directions comprising the vibrational pattern; and
    transmitting the message to the tactile belt.

9. The method of claim 1, further comprising:
    determining the vibrational pattern based on a threshold distance between the user and the at least one object.

10. A system comprising:
    one or more processors, the processors being configured to:
    determine a first path for a mobile computing device associated with a user to move within an environment;
    receive image data from a scanner associated with the mobile computing device, the image data including one or more images the user and one or more objects in the environment;
    determine a location of a user of a tactile belt using the image data;
    determine a position of at least one object in proximity to the user using the image data;
    determine a second path for the user to avoid the at least one object based on the location of the user and the position of the at least one object;
    generate linear and angular velocities that correspond to the second path; and
    generate directions that correspond to the linear and angular velocities by converting the linear and angular velocities to a vibrational pattern for the tactile belt, the vibrational pattern including one or more of a directional pattern and a rotational pattern for vibrating one or more motors of the tactile belt.

11. The system of claim 10, the system is further configured to:
    determine a location of the mobile computing device;
    determine the first path for the mobile computing device to avoid the at least one object;
    convert the directions to an audio file; and
    transmit the audio file.

12. The system of claim 10, wherein the system is further configured to:
    predict the vibrational pattern based on the user's historical path data and current path data.

13. The system of claim 10, wherein the system is further configured to:
   determine the vibrational pattern based on a threshold distance between the user and the at least one object.

14. A computer program product comprising a non-transitory computer usable medium including a computer readable program, wherein the computer readable program when executed on a computer causes the computer to:
   determine a first path for a mobile computing device associated with a user to move within an environment;
   receive image data from a scanner associated with the mobile computing device, the image data including one or more images of the user and one or more objects in an environment;
   determine a location of the user of a tactile belt using the image data;
   determine a position of at least one object in proximity to the user using the image data;
   determine a second path for the user to avoid the at least one object based on the location of the user and the position of the at least one object;
   generate linear and angular velocities that correspond to the second path; and
   generate directions that correspond to the linear and angular velocities by converting the linear and angular velocities to a vibrational pattern for the tactile belt, the vibrational pattern including one or more of a that includes the directional pattern and a rotational pattern for vibrating one or more motors of the tactile belt.

15. The computer program product of claim 14, the computer readable program is further configured to:
   determine a location of the mobile computing device;
   determine the first path for the mobile computing device to avoid the at least one object;
   convert the directions to an audio file; and
   transmit the audio file.

16. The computer program product of claim 14, wherein the computer readable program is further configured to:
   predict the vibrational pattern based on the user's historical path data and current path data.

17. The computer program product of claim 14, wherein the computer readable program is further configured to:
   determine the vibrational pattern based on a threshold distance between the user and the at least one object.

* * * * *